United States Patent Office 3,217,326
Patented Nov. 9, 1965

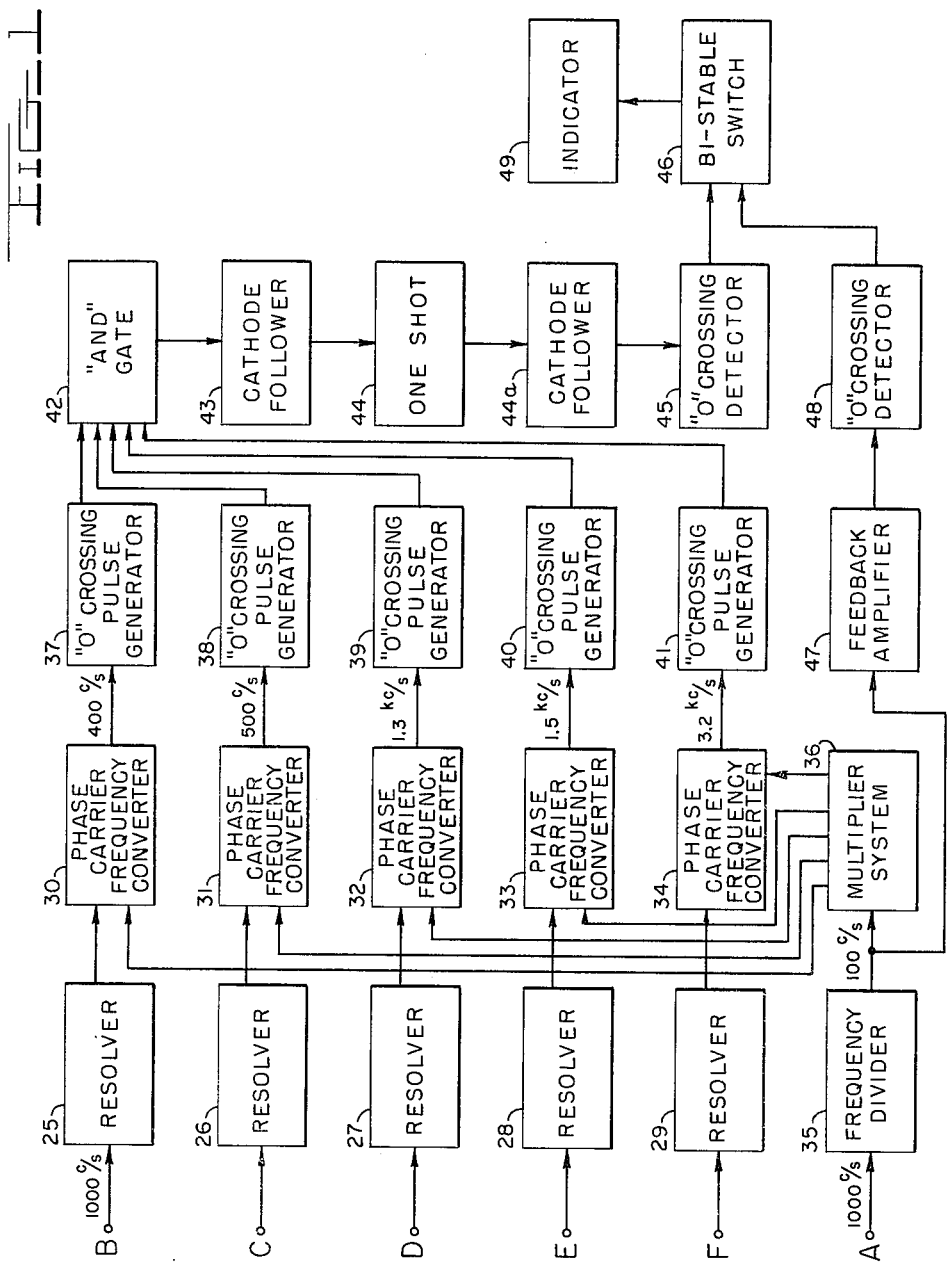

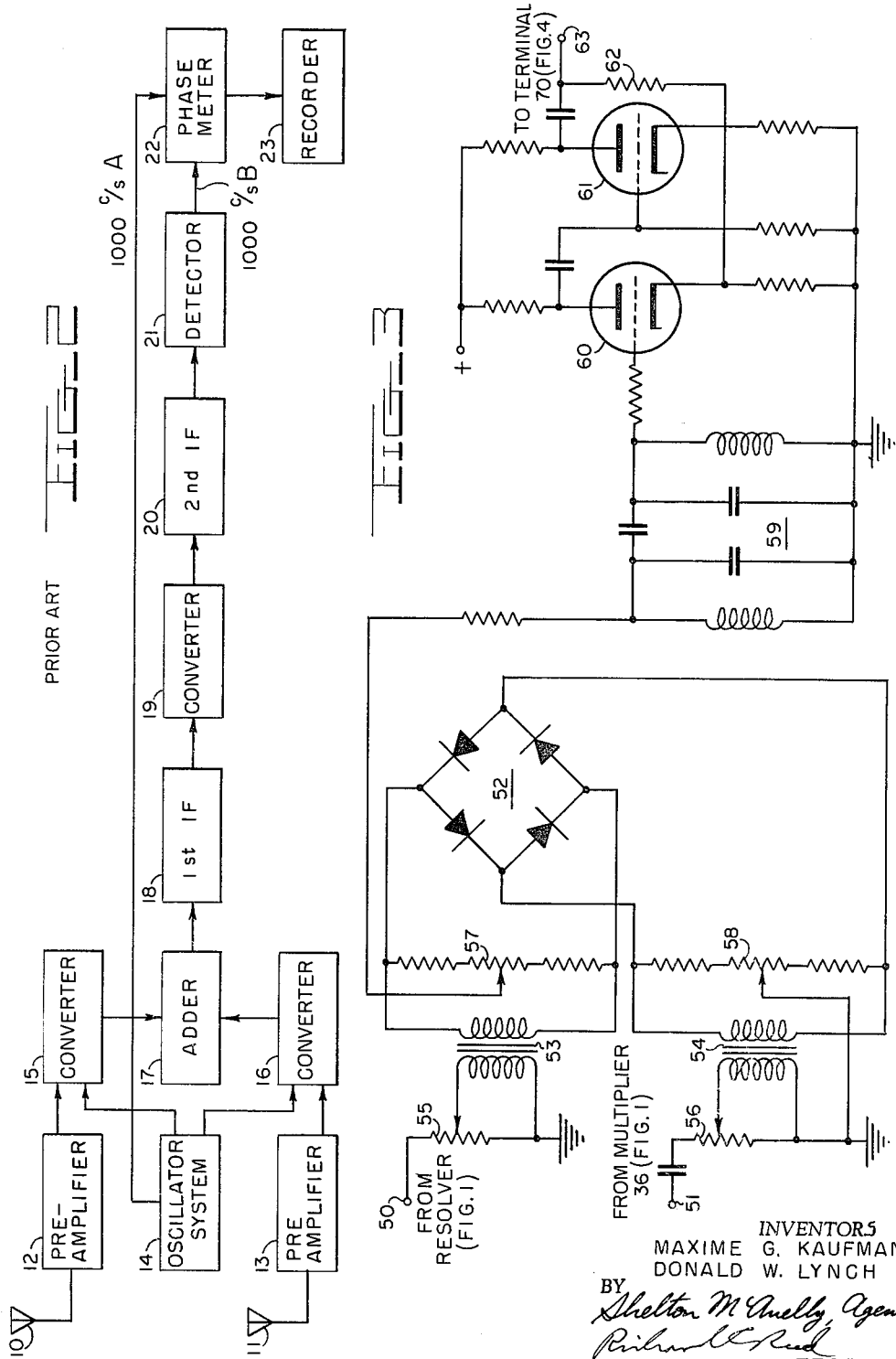

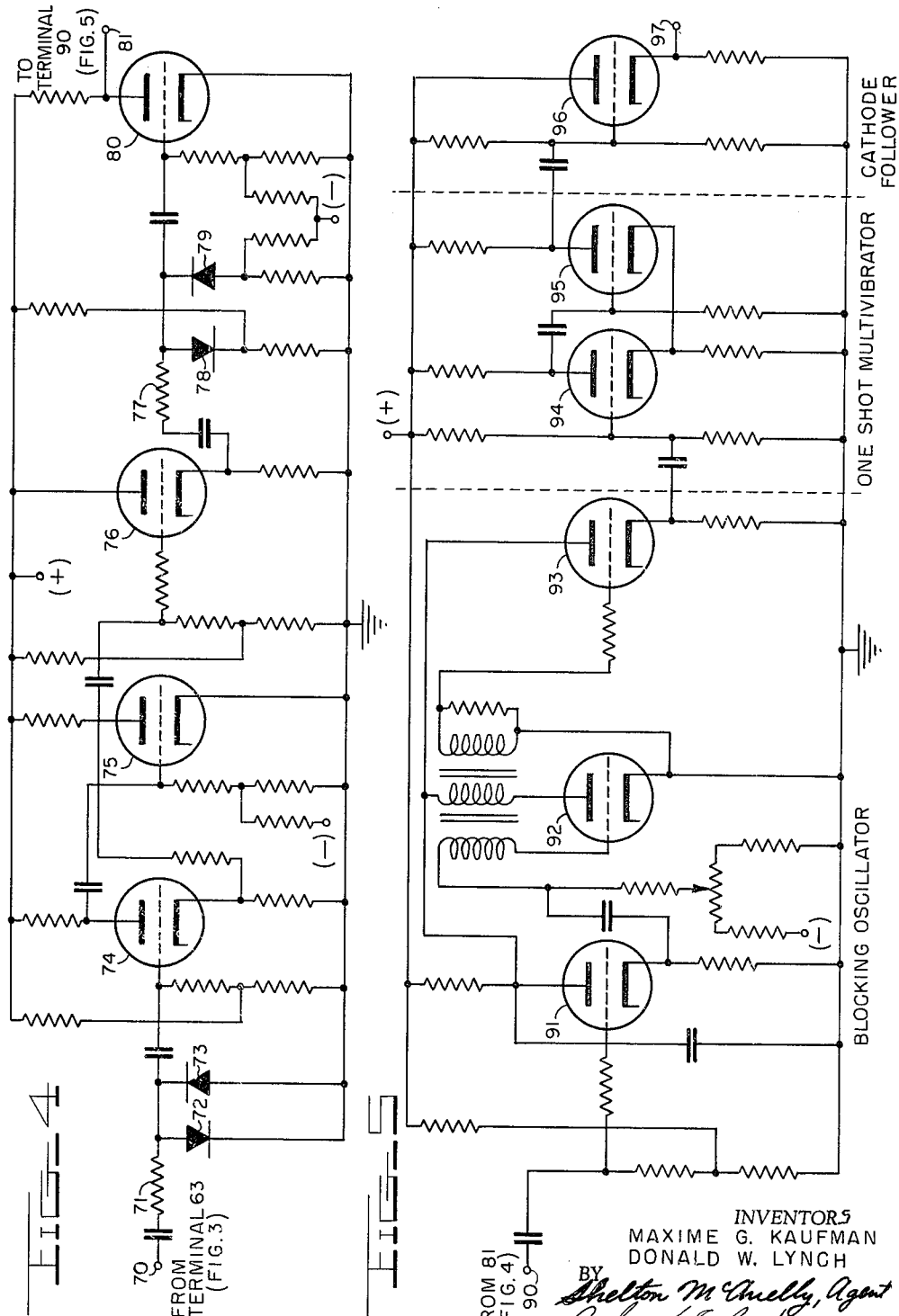

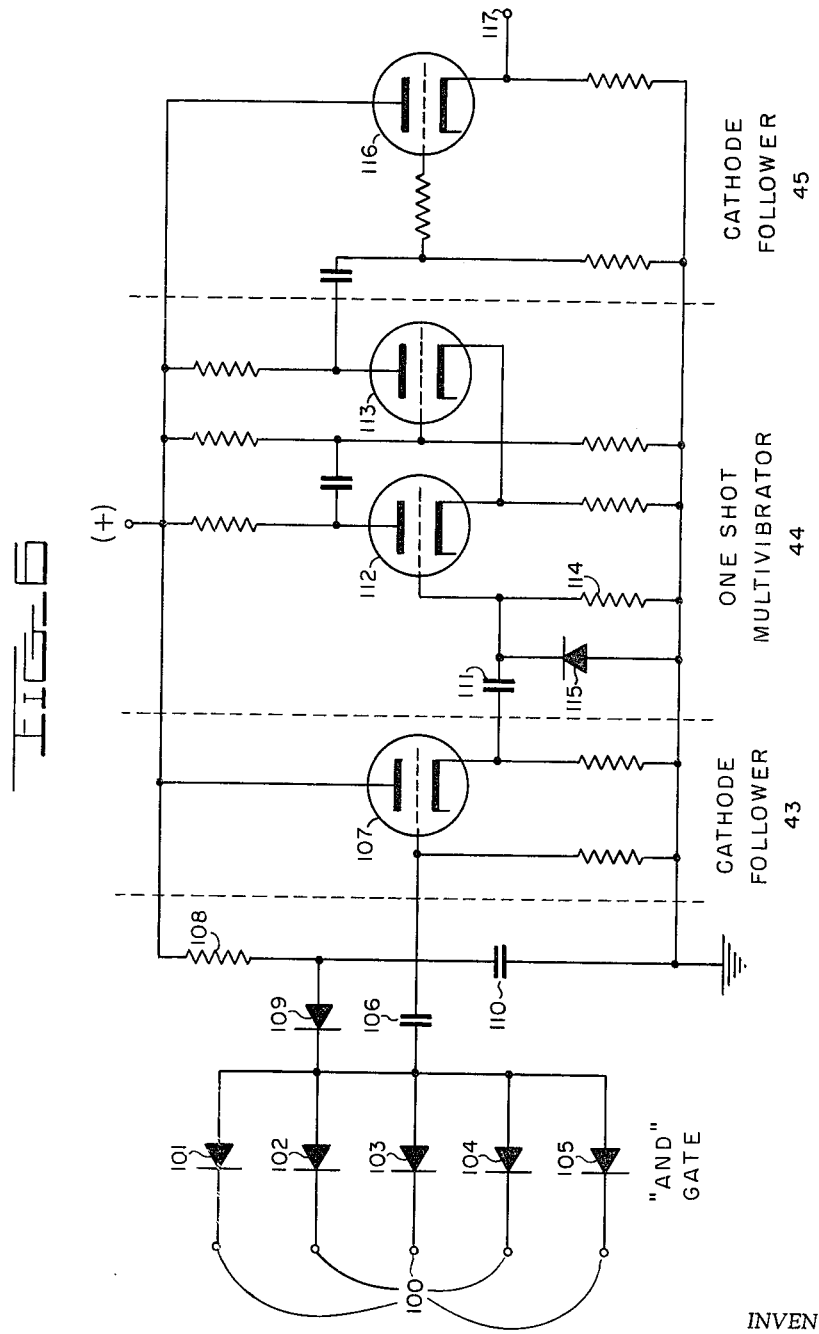

3,217,326
SPACE SURVEILLANCE SYSTEM WITH INSTANTANEOUS RESOLUTION OF MULTIPLE CYCLE PHASE AMBIGUITY
Maxime G. Kaufman, Camp Springs, Md., and Donald W. Lynch, Springfield, Va., assignors to the United States of America as represented by the Secretary of the Navy
Filed Apr. 30, 1963, Ser. No. 277,059
8 Claims. (Cl. 343—113)
(Granted under Title 35, U.S. Code (1952), sec. 266)

The invention described herein may be manufactuerd and used by or for the Government of the United States of America for governmental purposes without the payment of any royalties thereon or therefor.

This invention relates to radio interferometer measurements and in particular to the avoidance of ambiguity in the measurement of angle of arrival of incoming electromagnetic wave energy.

The interferometer technique as used in the determination of the direction of arrival or apparent source direction of incoming electromagnetic wave energy has been exploited to a considerable extent for the determination of the direction of satellites or other objects in orbit around the earth, or otherwise in space. Several reasons for this are that such objects normally move at high angular rates relative to the surface of the earth and that continuous time and angle horizon-to-horizon sensitivity, at least in one plane, is usually required to insure complete sensing. These reasons clearly rule out antenna systems having sufficiently narrow beam angles to provide angle sensing on a "pointing" basis because if the angle is narrow enough to provide the angular accuracy needed, it cannot provide the continuous coverage of all angles required.

The interferometer technique determines direction of incidence on a phase difference basis, that is, by measuring the difference in phase of the incident energy at separated points. Only if the direction of incident energy is perpendicular to the line containing the points will the energy arrive at both points in exact phase. For displacement of the direction of the energy to either side of the perpendicular, the energy will arrive at one point at a different phase angle from that at the other point. If the points are widely spaced, small deviations from the perpendicular will produce large phase angle differences and accurate direction discrimination is possible. Immediately an inherent difficulty presents itself however, because phase measuring devices as a practical matter with intermittent phenomena are limited to 360 degrees. This arises because without some way of keeping track of the number of 360 degree complete cycles involved, a phase meter will give the same indication for a typical twenty degrees phase difference as for 360 degrees plus 20 degrees, 720 degrees plus 20 degrees, etc.

Prior systems, such as are described in U.S. Patent No. 3,125,756 issued March 17, 1964, to Maxime G. Kaufman and Leonard O. Hayden and in an article "Tracking the Earth Satellite, and Data Transmission, by Radio," by John T. Mengel in the June 1956 issue of the Proceedings of the IRE, have provided resolution of such ambiguity by employing a plurality of antenna pairs with different spacings. Thus, eight or ten or more antenna pairs have been used with readings being continuously taken and recorded and later analyzed by hand, or with the assistance of some computation device, to determine the occurrence and direction of objects in orbit. The computation device frequently is a complex apparatus located at some distance from the antenna system, requiring accurate transmission of multichannel information over long distances, and it is normally the case that it is not determined that an object has passed overhead until considerable time has elapsed.

The present system, on the other hand, has as an object the provision of a method and apparatus for direction determination, wherein the complex computer of the prior art is not required, but yet, an instantaneous real time indication is available in a single line as to the direction to an object passing in orbit. That indication can be derived in the vicinity of the antenna itself so that there is no longer the need for a long distance multichannel data transmission system.

Other objects and many of the attendant advantages of this invention will be readily appreciated as the same becomes better understood by reference to the following detailed description when considered in connection with the accompanying drawings wherein:

FIG. 1 shows in block form a typical embodiment of the features of the present invention.

FIG. 2 shows prior art circuitry used to derive signals utilized by FIG. 1.

FIG. 3 shows typical schematic structure for the phase carrier frequency converters 30–34 of FIG. 1.

FIG. 4 shows typical schematic details of part of the "0" crossing pulse generators 37–41 of FIG. 1.

FIG. 5 shows details of the pulse generator portions of the "0" crossing pulse generators 37–41 of FIG. 1.

FIG. 6 shows schematic details of components 42, 43, 44, 45, of FIG. 1.

In accordance with the basic teachings of the present invention, a method of combining signals from interferometer antenna pairs is provided, wherein the signals from the pairs are placed in phase carrier frequency relationships corresponding to the spacing of the antenna pairs producing them, converted to pulses of approximately 0.4 duty cycle, and then combined to derive an output indication when the pulse signals achieve coincidence. This indication is dependent upon and characteristic of the direction of arrival of incoming electromagnetic wave energy.

Typically, antenna pair separations of 16, 20, 52, 60, and 128 feet involve phase carrier frequencies of 400, 500, 1300, 1500, and 3200 cycles per second, respectively.

With reference now to FIG. 1 of the drawing, the apparatus shown therein is a typical embodiment of the features of the present invention.

This apparatus is intended to receive at points A through F signals from the prior art type of systems, in which the signal A is a phase reference signal and the others are signals derived by antenna systems having different baselines or spacing between elements. To further illustrate the prior art, FIG. 2 may be considered momentarily, showing two antennas 10 and 11, spaced so as to have a typical baseline or separation of 16 feet to provide the coarsest measure of direction of arrival of incident energy. Signals from the antennas 10 and 11 are amplified by a conventional prior art system such as that shown including the preamplifiers 12, 13, oscillator system 14, dual converters 15, 16, adder 17, together with an intermediate frequency amplification and detection system identified by the components 18, 19, 20, and 21. A reference phase signal typcially at the frequency of 1000 cycles per second is obtained from the oscillator system 14 and compared with the signal delivered through the intermediate frequency amplification system by phase meter 22, the output of which is recorded by a suitable form of strip chart device or the like, identified by reference character 23. Typically the output of detector 21 is at 1000 cycles per second identified by the reference character B and it is displaced in phase relative to the signal A in dependency upon the angle of incidence of electromagnetic wave energy upon the antennas 10 and 11. Typically with inphase incidence of energy upon the antennas 10 and 11, the signals A and B would be in phase or bear some standard reference phasing which condition would be altered when incident energy arrives from some other direction such as to cause the phase of the signal at one antenna to change relative to the signal at the other.

Other signals C, D, E, and F of FIG. 1 will be derived by similar apparatus with antenna baseline spacings of 20, 52, 60, and 128 feet, respectively.

Returning to FIG. 1, the signals B, C, D, E, F, are each delivered to a corresponding resolver 25, 26, 27, 28, 29, by means of which the phasing of the signals B through F may be adjusted to some desired basic condition to compensate for any undesired phase shift introduced by any cause such as transmission line length differences, and the like. The outputs of the resolvers 25 through 29 are delivered individually to phase carrier frequency converters 30, 31, 32, 33, 34, the purpose of which is to convert the signals to selected carrier frequencies. These carrier frequencies are selected so as to bear the same relationship to each other as the baseline lengths or separation of the antennas involved. Thus, with the baselines of the antennas used for B and C being spaced from the antenna for A by 16 and 20 feet, respectively, the frequencies selected for the signals from the converters 30 and 31 will also be related in this ratio, typically being 400 cycles per second and 500 cycles per second, respectively. Other frequencies involved are 1.3 kilocycles per second for the output from 32, 1.5 kilocycles per second for the output from 33, and 2 kilocycles per second for the output from 34.

Careful attention to frequencies and operation of the converters is necessary to maintain the initial phase relationships throughout. Thus, all of the phase carrier frequency converters derive their mixing signals from a single basic signal, preferably so that the difference between the 1000 cycle per second signals obtained from the resolvers will produce the desired output frequencies from the various phase carrier frequency converters.

Thus, the phase carrier frequency converter 30 will receive a 1400 cycle per second signal from 36, the phase carrier frequency converter 31 will receive a 1500 cycle per second signal from 36, and so forth.

The operation of the multiplier system 36 is conventional in nature, including typically various tuned circuits to select the desired multiples of the applied 100 cycle per second signal required by the various converters for mixing with the input 1000 cycle per second signals. Synchronism of the multiplier system 36 to the basic input signal A is obtained through a frequency divider 35 which produces division of the 1000 cycle per second reference signal by a factor of 10 to obtain the 100 cycle per second input signal indicated as utilized by the multiplier system. Actually it must be realized that the particular configuration of divider and multiplier described for FIG. 1 is merely exemplary and that other arrangements capable of producing the required signals for the various phase carrier frequency converters would be suitable.

The phase carrier frequency converters 30 through 34 are connected individually to "0" crossing pulse generators 37, 38, 39, 40, and 41. These particular components produce pulses of a uniform duty cycle, typically 42%, which are keyed to a precisely selected and maintained phase angle in the sinusoidal output of the phase carrier frequency converters. Typically, the selected phase angle of the sinusoid would be the crossing of the 0 voltage line in one particular direction which is sensed by the "0" crossing pulse generators, following which the production of the 42% duty cycle pulse at the frequency of the respective phase carrier frequency converter output is realized.

The "0" crossing pulse generators 37 through 41 are connected to "AND" gate 42, the purpose of which is to produce an output signal when all of the pulses from the "0" crossing pulse generators achieve a particular level at the same instant in time. This can only occur at an instant in time characteristic of the phasing in the signals B through F relative to the signal A for a particular incoming signal direction. Thus, it is necessary merely to measure the relative time lapse between a reference phasing of the output 100 cycle per second signal from frequency divider 35 and the attainment of the coincidence indication obtained from the "AND" gate 42 to provide a direct indication of the angle of incidence of incoming electromagnetic wave energy.

The balance of the apparatus of FIG. 1 is concerned with the measurement of this phase angle and the production of a suitable indication which can be observed in real time or which may be recorded for use at some later time.

To this end, the output of the "AND" gate 42 is applied to a cathode follower impedance conversion device 43 which is employed to drive a one-shot pulse generator circuit 44, which circuit in turn is succeeded by the cathode follower 45. Another "0" crossing detector device, such as that in the "0" crossing pulse generators 37 through 41, is connected to the output of cathode follower 45 to produce pulses which are precisely related to a particular phase of signals to maintain conditions of substantial uniformity at all times. The "0" crossing detector 45 is connected to bi-stable switch 46 which also receives a second input from the output of the frequency divider 35 via feedback amplifier 47 and "0" crossing detector 48. The bi-stable switch 46 is intended to produce a rectangular wave signal at the frequency of 100 cycles per second, in which the duration of one state is dependent upon the difference in time between the occurrence of a reference phasing of the 100 cycle per second signal from the output of frequency divider 35 and the occurrence of the coincidence condition sensed by "AND" gate 42. Thus, for example, if the length of this particular portion of the rectangular wave in question is the positive or high voltage portion of the square wave, this high voltage condition will start at a reference phasing of the 100 cycle per second signal from the frequency divider 35 and will terminate upon the occurrence of the coincidence condition, which situation will repeat at the rate of 100 cycles per second, always returning to the reference "high" condition at the selected phase condition of the output of frequency divider 35. With such a rectangular wave signal it is then possible to place a simple meter device, such as a galvanometer, in the output of the bi-stable switch 46, which can measure the average voltage of this output signal and indicate directly the angle of incidence of incoming electromagnetic wave energy from horizon to horizon. Such an indicator is shown in FIG. 1 as the component associated with reference character 49. A filter integrator between the bi-stable switch and the meter may be desirable to assist signal energizing.

The indicator 49 in some instances may be a strip chart form of recorder device to produce permanent retention of information obtained, depending upon the particular utility desired for the overall apparatus.

FIGS. 3 through 6 show details of typical components of the basic apparatus of FIG. 1, intended to show one way in which the basic invention can be realized. It should be evident upon inspection that these circuits are exemplary and are not necessarily limiting, in that other forms of apparatus can be devised by those skilled in the art which will fulfill the requirements for the components of the basic FIG. 1.

To proceed to the discussion of FIG. 3, typical structure for the phase carrier frequency converters 30 through 34 is shown. Typically, the various converters would employ similar circuits of FIG. 3, the distinction being that certain frequency selective portions are included, which will be mentioned, which are tuned to the appropriate frequency indicated for the output of the various phase carrier frequency converters in FIG. 1. To this end the apparatus of FIG. 3 is provided with input terminals 50 and 51, one of which receives the output of the resolver, such as 25, whereas the other input terminal receives the output of the multiplier 36 which is selected so as to provide a carrier signal for "B" which is of the desired frequency. Typically, all signals applied to terminal 50 for all phase carrier frequency converters 30 through 34 will be at the frequency of 1000 cycles per second, however, they will possess variable phase relationships relative to the signal A to carry the phase intelligence derived by virtue of the antenna spacings relative to antenna A employed for the various antennas producing the signals B through F. Since, for the phase carrier frequency converter 30 an output at the frequency of 400 cycles per second is indicated, typically the input 51 would receive a signal of frequency 1400 cycles per second, obtained by multiplying the 100 cycle per second output signal from frequency divider 35 by a factor of 14. The phase carrier frequency converter will then contain filters selective of the difference frequency of 400 cycles per second. Terminals 50 and 51 are connected to a balanced bridge mixer 52. Input D.C. isolation and balancing is provided by the transformers 53 and 54. Input amplitude selection potentiometers 55 and 56, and balance adjusting potentiometer circuits 57, 58, are shown. The output from the bridge mixer circuit is delivered to a frequency selective circuit indicated, in general, by the reference character 59 with inductance and capacitance filter components selected so as to provide the frequency response characteristics desired.

Output from filter 59 is applied to a two-stage feedback amplifier shown containing the electron tubes 60 and 61 in a two-stage tandem with plate to cathode feedback through resistance 62.

The output from the phase carrier frequency converter is taken at the anode of tube 61 to which an output terminal 63 is connected. The output realized at terminal 63 will be of a sinusoidal nature because of the narrow band characteristics normal for such a filter 59.

Details of the "0" crossing pulse generators 37 through 41 are indicated in FIG. 4 to which attention is now directed. Output terminal 63 of FIG. 3 is connected to input terminal 70 of FIG. 4. Connected to terminal 70 is a square wave clipping circuit consisting of the resistance 71 and the unilateral impedance elements 72 and 73, which convert the sinusoidal signal at 63 into a square wave signal of moderately steep leading and trailing edges. The sharpness of the leading and trailing edges is improved by the use of a two-stage feedback amplifier containing electron tubes 74 and 75, which are biased so as to obtain operation near the linear portions of their characteristics. Amplifier 75 is succeeded by a cathode follower amplifier circuit 76 which is employed to drive a second clipping stage of resistance 77 and unilateral impedance devices 78 and 79. The second clipping stage is biased with suitable positive and negative potentials so as to produce a larger amplitude signal than the first clipping stage of unilateral impedance elements 72 and 73, and drives the output amplifier 80, which itself is biased to operating regions of linear characteristics. The amplified output from 80, which is a square wave of sharp leading and trailing edges and 50% duty cycle is obtained at terminal 81.

The apparatus of FIG. 4 provides a square wave output. From this 50% duty cycle signal pulses of shorter duration, typically, a 42% duty cycle, are produced by the circuitry of FIG. 5.

Output terminal 81 of FIG. 4 is connected to input terminal 90 of FIG. 5, which is connected to a keying tube 91 for the blocking oscillator circuit of tube 92. Short duration pulses produced by the blocking oscillator of tube 92 are applied through the cathode follower stage of tube 93 to the one-shot multivibrator of tubes 94 and 95 to produce rectangular wave output which may be characterized as pulses having a 42% duty cycle. Again, output isolation from the circuit of tubes 94 and 95 is provided by a suitable cathode follower stage 96, which provides the desired positive pulses of 42% duty cycle at terminal 97.

Details of components 42, 43, 44, 45, of FIG. 1 are shown in FIG. 6, to which attention is now directed.

Each terminal 97 of the "0" crossing pulse generators 37 through 41 is connected to an input terminal 100, indicated in FIG. 6. Each terminal 100 is connected through a primary unilateral impedance device 101, 102, 103, 105, and single capacitance 106 to the grid of a cathode follower impedance isolation stage of tube 107. Biasing of the primary unilateral impedance devices 101 through 105 is provided by a resistor 108, together with a secondary unilateral impedance device 109 and a capacitance 110. Whenever merely one of the points 97 of the "0" crossing pulse generators 37 through 41 is at a low potential, conduction through the appropriate unilateral impedance device 101 through 105 causes the potential between the common connection of these primary unilateral impedance devices and the secondary unilateral impedance device 109 to be at a potential which may be described as low. When all of the points 97 are at a high potential, all of the unilateral impedance devices 101 through 105 are in the "less conductive" condition to produce an increase in potential at the common point between the unilateral impedance devices 101 through 105 and device 109. This increase in potential is coupled via capacitor 106 to the grid of tube 107 and produces a corresponding increase at the cathode of tube 107, which is coupled via a capacitance 111 to tube 112. Tube 112, together with tube 113, forms a one-shot multivibrator. Capacitance 111 is in a coupling circuit which is virtually a differentiator circuit with a small resistance 114, together with a unilateral impedance device 115, which improves the response of the circuit to positive pulses and virtually eliminates the negative going signals at the grid of tube 112.

Output signals obtained at the anode of tube 113 are applied by a cathode follower impedance isolation device 116 to output terminal 117.

The balance of the apparatus of FIG. 1 is now readily evident, the "0" crossing detectors 45 and 48 are typified by the apparatus of FIG. 4, the feedback amplifier 47 by the portion of FIG. 4 containing the feedback amplifier of tubes 74 and 75, and the bi-stable switch 46 is typified as an Eccles-Jordan circuit triggered into one condition by the pulse from terminal 81 (FIG. 4) of the "0" crossing detector 48, and into the opposite condition by pulses obtained from a similar terminal 81 of component 45. The indicator 49 will thus indicate the duration of one state of the Eccles-Jordan circuit 46, and will be directly dependent upon the angle of incidence of the incoming electromagnetic wave energy upon the antenna system.

From the foregoing it is obvious that the invention may be utilized in some form other than precisely that shown, for example, the output indicated is essentially analog. Such is not limiting however, because the time duration of the indicated state of the Eccles-Jordan circuit 46 is directly proportional to space angle and the quantity of pulses of a fixed frequency occurring during this time will provide a direct, high accuracy digital representation of space angle.

What is claimed is:

1. In an interferometer for measuring the direction of arrival of electromagnetic wave energy,
    means for producing a reference phase signal in dependency on the signals received at a first pair of locations and a first phase information signal in dependency on the apparent relative phasing of the signals received at said first pair of locations,
    means for producing a second phase information signal in dependency on the apparent relative phasing of signals received at a second pair of locations,
    means for measuring the time relationship of a selected phase angle of the reference signal and the occurrence of selected phasing of the first and second phase information signals, and indicator means for producing an indication in dependency on said time relationship.

2. In apparatus for resolving multiple cycle ambiguity phase measurement of coherent electromagnetic wave ;nals arriving at first and second locations, means for producing a reference phase signal in accordance with arriving electromagnetic wave signals, means for deriving a plurality of phase information signals in dependency on the apparent relative phasing between incoming electromagnetic wave signals derived at different spacings in the region of the first and second location, means for placing each of said phase information signals on a carrier signal, the frequencies of the carriers being related in the same proportions as the spacing relationship between the points for which the information signals are derived, coincidence means for producing an indication when the carrier signals simultaneously achieve a selected phase relationship, and means for indicating the time relationship between a selected phase angle of the reference phase signal and the occurrence of the coincidence indication.

3. In apparatus for resolving multiple cycle ambiguity phase measurement of coherent electromagnetic wave gnals arriving at first and second locations, means for producing a reference phase signal in accordance with arriving electromagnetic wave signals, means for producing a first phase information signal in dependency on the apparent relative phasing between incoming energy received at a first spaced pair of locations, means for producing a second phase information signal in dependency on the apparent relative phasing between incoming energy received at a pair of locations having a different relative spacing than the first pair, means for converting the first and second phase information signals into signals of frequencies related to each other in the ratio of the spacing of the corresponding pairs of locations, means for producing a coincidence signal when the first and second phase information signals achieve a selected phase relationship, and means for producing an output indication in dependency on the time relationship between the coincidence signal and a selected phase angle of the reference signal.

4. In apparatus for resolving multiple cycle ambiguity phase measurement of coherent electromagnetic wave gnals arriving at first and second locations, means for producing a reference phase signal in accordance with arriving electromagnetic wave signals, means for deriving a plurality of phase information signals in dependency on the apparent relative phasing between incoming electromagnetic wave signals derived at different spacings in the region of the first and second locations, means for placing each of said phase information signals on a carrier signal, the frequencies of the carriers being related in the same proportions as the spacing relationship between the points for which the information signals are derived, means converting each carrier signal into a recurrent pulse signal of the frequency of the corresponding carrier signal, said pulse signal having a duty cycle less than 50%, coincidence means for producing an indication when the pulses exist simultaneously, and means for indicating the time relationship between a selected phase angle of the reference phase signal and the occurrence of the coincidence indication.

5. In apparatus for resolving multiple cycle ambiguity in phase measurement of coherent electromagnetic wave signals arriving at first and second locations, means for producing a reference phase signal in accordance with arriving electromagnetic wave signals, means for deriving a plurality of phase information signals in dependency on the apparent relative phasing between incoming electromagnetic wave signals derived at different spacings in the region of the first and second locations, means for placing each of said phase information signals on a carrier signal, the frequencies of the carriers being related in the same proportions as the spacing relationship between the points for which the information signals are derived, means converting each carrier signal into a recurrent pulse signal of the frequency of the corresponding carrier signal, said pulse signal having a duty cycle less than 50%, coincidence means for producing an indication when the pulses exist simultaneously, means for initiating a time measurement period at a selected phase of the reference phase signal, means for terminating a time measurement period upon the occurrence of the coincidence signal, and means for indicating the duration of the time measurement period.

6. In apparatus for resolving multiple cycle ambiguity in phase measurement of coherent electromagnetic wave signals arriving at first and second locations, means for producing a reference phase signal in accordance with arriving electromagnetic wave signals, means for deriving a plurality of phase information signals in dependency on the apparent relative phasing between incoming electromagnetic wave signals derived at different spacings in the region of the first and second locations, means for placing each of said phase information signals on a carrier signal, the frequencies of the carriers being related in the same proportions as the spacing relationship between the points for which the information signals are derived, means responsive to the reference phase signal for maintaining synchronism in the carriers, coincidence means for producing an indication when the carrier signals simultaneously achieve a selected phase relationship, and means for indicating the time relationship between a selected phase angle of the reference phase signal and the occurrence of the coincidence indication.

7. In apparatus for resolving multiple cycle ambiguity in phase measurement of coherent electromagnetic wave signals arriving at first and second locations, means for producing a reference phase signal in accordance with arriving electromagnetic wave signals, means for deriving a plurality of phase information signals in dependency on the apparent relative phasing between incoming electromagnetic wave signals derived at different spacings in the region of the first and second locations, means for placing each of said phase information signals on a carrier signal, the frequencies of the carriers being related in the same proportions as the spacing relationship between the points for which the information signals are derived, means responsive to the reference phase signal for deriving phase locked mixing signals for heterodyning with the phase information signals in the placement thereof on the respective carrier signals, coincidence means for producing an indication when the carrier signals simultaneously achieve a selected phase relationship, and means for indicating the time relationship between a selected phase angle of the reference phase signal and the occurrence of the coincidence indication.

8. In apparatus for resolving multiple cycle ambiguity in phase measurement of coherent electromagnetic wave signals arriving at first and second locations, means for producing a reference signal, means for deriving a plurality of phase information signals in dependency on the apparent relative phasing between incoming electromagnetic wave signals derived at different spacings in the region of the first and second locations, means for placing each of said phase information signals on a carrier signal, the frequencies of the carriers being related in the same proportions as the spacing relationship between the points for which the information signals are derived, means responsive to the reference phase signal for deriving phase locked mixing signals for heterodyning with the phase information signals in the placement thereof on the respective carrier signals, coincidence means for producing an indication when the carrier signals simultaneously achieve a selected phase relationship, and means for indicating the time relationship between a selected phase angle of the reference phase signal and the occurrence of the coincidence indication.

References Cited by the Examiner
UNITED STATES PATENTS 2,426,460  8/47  Lewis _____ 343—100

OTHER REFERENCES

Mengel: Tracking the Earth Satellite, and Data Transmission by Radio, Proc. I.R.E., June 1956, pp. 755–760.

Moore: Digital Phase Angle Meter Control, IBM Technical Disclosure Bulletin, vol. 3, No. 2, July 1960.

CHESTER L. JUSTUS, *Primary Examiner.*